United States Patent Office 3,278,574
Patented Oct. 11, 1966

3,278,574
STABILIZATION OF MERCAPTO-SUBSTITUTED NITRILES
Rector P. Louthan, Bartlesville, Okla., assignor to Phillips Petroleum Company, a corporation of Delaware
No Drawing. Filed May 6, 1963, Ser. No. 278,445
10 Claims. (Cl. 260—465.1)

This invention relates to the stabilization of mercapto-substituted nitriles, such as 3-mercaptopropionitrile. In another aspect, it relates to a process for stabilizing mercapto-substituted nitriles and to the stabilized nitriles so obtained.

Mercapto-substituted nitriles are organic sulfur compounds of considerable industrial importance. These compounds, such as 3-mercaptopropionitrile, tend to be unstable. 3-mercaptopropionitrile, for example, breaks down, even at room temperatures, at conditions normally encountered during storage to form a viscous polymeric-like material; such decomposition is accelerated at elevated temperatures, making the distillation of the 3-mercaptopropionitrile very difficult.

Accordingly, an object of this invention is to provide a process for stabilizing mercapto-substituted nitriles, such as 3-mercaptopropionitrile. Another object is to provide stabilized mercapto-substituted nitriles. Further objects and advantages of this invention will become apparent to those skilled in the art from the following discussion and appended claims.

Briefly, I have discovered that mercapto-substituted nitriles can be stabilized by mixing the same with a stabilizing acid in an amount sufficient to bring about said stabilization. In particular, I have found that acids having an ionization constant greater than $1 \times 10^{-4}$ (at 25° C.) can be used as stabilizers for the mercapto-substituted nitriles. One group of acids I can employ as stabilizers are alkane sulfonic acids, aromatic sulfonic acids, and hydrates of these acids. Representative of this group of acids are methanesulfonic acid, ethanesulfonic acid, n-butanesulfonic acid, hexanesulfonic acid, benzenesulfonic acid, p-toluenesulfonic acid, 3-ethylbenezenesulfonic acid, 2,4-dimethylbenzenesulfonic acid, and the like, and hydrates of these acids. In addition to the acids of this group, I also can employ the following acids as stabilizers: phosphoric acid, sulfuric acid, bromoacetic acid, alpha or beta-bromopropionic acid, chloroacetic acid, alpha-chloropropionic acid, fumaric acid, iodic acid, maleic acid, malonic acid, oxalic acid, trichloroacetic acid and the like, including mixtures thereof. The stabilizing acids used in this invention are inert with respect to the mercapto-substituted nitriles mixed therewith.

The amount of the stabilizing acid can vary, and stated functionally this amount will be sufficient to stabilize the mercapto-substituted nitrile. The stabilizing acid can be simply added to and admixed with the nitrile or material containing the nitrile. The particular amount of stabilizing acid used will depend upon such factors as the particular acid used the degree of stabilization desired, and the temperature to which the treated nitrile is to be subjected. Generally, the amount of stabilizing acid which can be used will be in the range of 0.05 to 5 weight percent of the nitrile. The stabilizing acid will be effective at the conditions generally encountered during storage of the nitrile and is also effective in preventing the decomposition of the nitrile at conditions of elevated temperature such as are encountered during distillation of the mercapto-substituted nitrile from mixtures containing the same, such as reaction mixtures resulting from the synthesis of the nitrile. Where mild conditions are encountered during storage, a lesser amount of the stabilizing acid will be sufficient, usually less than 1 weight percent. Where severe conditions are encountered, such as those of elevated temperatures, larger amounts, such as 2 to 5 weight percent, of the stabilizing acid may be necessary.

The mercapto-substituted nitriles which can be stabilized according to the practice of this invention can be represented by the general formula:

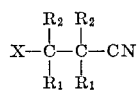

where:

$R_1$ is selected from the group consisting of hydrogen and lower alkyl hydrocarbon radicals, such as methyl, ethyl, propyl and butyl radicals,
$R_2$ is selected from the group consisting of said $R_1$ radicals and a mercapto radical (—SH), and
X is selected from the group consisting of cyano (—CN) and mercapto radicals, with the provisos that (1) where X is a mercapto radical, both of the $R_2$ radicals are selected from the group consisting of hydrogen and said alkyl radicals, and (2) where X is a cyano radical one of the $R_2$ radicals is selected from the group consisting of hydrogen and said alkyl radicals while the other $R_2$ radical is a mercapto radical.

Representative mercapto-substituted propionitriles coming within the scope of the above general formula and which can be stabilized according to the practice of this invention include: 3-mercaptopropionitrile, 2-methyl-3-mercaptopropionitrile, 3-methyl-3-mercaptobutyronitrile, 3-methyl-3-mercaptobutyronitrile, 2,3-dimethyl-3-mercaptobutyronitrile, 3-mercaptocapronitrile, 3-mercaptoenanthonitrile, 3 - methyl - 2 - mercaptomethylvaleronitrile, 2-n-propyl-3-mercaptovaleronitrile, 3 - methyl-3-mercaptovaleronitrile, 2,3 - di - n-butyl-3-mercaptoenanthonitrile, 3-mercaptobutane-1,4-dinitrile, 2-methyl-3-mercaptobutane-1,4-dinitrile, 2 - ethyl - 3 - mercaptobutane-1,4-dinitrile, 2,3-dimethyl-3-mercaptobutane - 1,4 - dinitrile, 2-isopropyl-3-tert-butyl-3-mercaptobutane-1,4-dinitrile, 2,3-di-n-butyl-3-mercaptobutane-1,4-dinitrile, and the like.

The subject invention is particularly applicable in stabilizing 3-mercaptopropionitrile, a compound which can be hydrolyzed almost quantitatively to 3-mercaptopropionic acid, the latter being useful in permanent wave solutions. By stabilizing 3-mercaptopropionitrile according to this invention, one can obtain a stabilized 3-mercaptopropionitrile without having to immediately hydrolize the compound to the corresponding 3-mercaptopropionic acid in order to prevent degradation of the propionitrile as produced.

The mercapto-substituted nitriles which are stabilized according to this invention can be prepared by known processes, but I prefer to prepare these mercapto-substituted nitriles by the process disclosed in copending application Serial No. 278,401, filed by R. P. Louthan et al., which copending application discloses the preparation of the mercapto-substituted nitriles by reaction of an unsaturated nitrile with hydrogen sulfide in the presence of a catalytic amount of sulfur. When the mercapto-substituted nitriles are prepared by the method of said copending application, or by any other method, the stabilizing acids of this invention can be added to the reaction mixture to permit distillation or recovery of the desired mercapto-substituted nitrile product without deterioration of the latter during and after such recovery.

The following examples further illustrate the objects and advantages of this invention, but it should be apparent that the various embodiments of this invention recited in these examples should not be construed so as to unduly limit this invention.

EXAMPLE I

A series of runs was carried out in which varying amounts of p-toluene-sulfonic acid monohydrate were used to stabilize 3-mercaptopropionitrile. The samples were stored in capped vials at room temperature (about 25° C.) under an atmosphere of air. The stored vials were visually examined from time to time and the color of the stored contents were noted. Fresh 3-mercaptopropionitrile per se is water white and tends to degrade during storage, turning yellow and then to a red viscous material. A control run was also carried out in which the 3-mercaptopropionitrile per se was stored. Results are set forth in Table I.

The stored vials were visually examined from time to time and the color of the stored contents were noted. For comparison purposes, a number of runs was also made in which such freshly prepared 3-mercaptopropionitrile per se was stored (i.e., without mixing it with any additive). In evaluating the stored vials, the color code of Table II was used. Results of said series of runs are set forth in Table III.

*Table II*

COLOR CODE

| Code Number: | Color |
| --- | --- |
| 1 | Water white. |
| 2 | Slightly yellow. |
| 3 | Yellow. |
| 4 | Bright yellow. |
| 5 | Red. |

*Table III*

| Run | Additive | Storage atmosphere [1] | Color [2] of sample after— | | | | | |
| --- | --- | --- | --- | --- | --- | --- | --- | --- |
| | | | 1 day | 2 days | 3 days | 5 days | 13 days | 19 days |
| 1 | None | $N_2$ | | | 2 | 5 | 5 | 5 |
| 2 | do | $N_2$ | | | 3 | 5 | 5 | 5 |
| 3 | do | $N_2$ | | | 3 | 5 | 5 | 5 |
| 4 | do | $O_2$ | | | 2 | 5 | 5 | 5 |
| 5 | do | Air | | | 2 | 5 | 5 | 5 |
| 6 | Stearic acid | Air | | | 2 | 5 | 5 | 5 |
| 7 | Glacial acetic acid | Air | 1 | 2 | 4 | 5 | | |
| 8 | n-Butylamine | Air | 3 | 4 | 5 | 5 | | |
| 9 | Diethylamine | Air | 3 | 4 | 5 | 5 | | |
| 10 | Triethylamine | Air | | | 5 | 5 | 5 | 5 |
| 11 | Pyridine | Air | | | 3 | 5 | 5 | 5 |
| 12 | Hydroquinone | Air | | | 4 | 5 | 5 | 5 |
| 13 | Triphenylmethylammonium hydroxide. | Air | | | 3 | 5 | 5 | 5 |
| 14 | Cumene hydroperoxide | Air | | | 3 | 5 | 5 | 5 |
| 15 | Cumene'-azo-diisobutyronitrile | Air | | | 2 | 5 | 5 | 5 |
| 16 | Sulfur | Air | | | 4 | 5 | 5 | 5 |

[1] Sample of run 1 was stored in complete darkness. Sample of run 2 was stored where it received direct sunlight during the day. Samples of all other runs were stored under lab hood where they received only indirect light during the day.
[2] See color code of Table II.

*Table I*

| Run | Amt. of p-toluene-sulfonic acid monohydrate, wt. percent of propionitrile | Color |
| --- | --- | --- |
| 1 | None | Yellow after 4 days and red after 7 days. |
| 2 | 0.10 | Remained white after 41 days. |
| 3 | 0.25 | Do. |
| 4 | 0.50 | Do. |
| 5 | 1.00 | Do. |
| 6 | 2.00 | Do. |

EXAMPLE II

A series of control runs was carried out in which freshly distilled 3-mercaptopropionitrile was placed in vials, with about 1 wt. percent (based on the weight of the propionitrile) of various additives. The 3-mercaptopropionitrile in the vials was covered with various atmospheres, and the capped vials stored at room temperature (about 25° C.).

EXAMPLE III

Another series of runs was carried out in a manner like that disclosed in Example I, in which varying amounts of different stabilizing acids of this invention were added to 3-mercaptopropionitrile. Results of this series of runs are set forth in Table IV.

*Table IV*

| Run | Additive [1] | Color |
| --- | --- | --- |
| 1 | None | Yellow after 2 days and red after 22 days. |
| 2 | 0.1 wt. percent p-toluenesulfonic acid monohydrate. | Yellow after 21 days and red after 22 days. |
| 3 | 0.25 wt. percent p-toluenesulfonic acid monohydrate. | Remained white after 32 days. |
| 4 | 0.5 wt. percent p-toluenesulfonic acid monohydrate. | Do. |
| 5 | 1.0 wt. percent p-toluenesulfonic acid monohydrate. | Do. |
| 6 | 0.1 wt. percent phosphoric acid (85%) | Do. |
| 7 | 0.25 wt. percent phosphoric acid (85%) | Do. |
| 8 | 0.5 wt. percent phosphoric acid (85%) | Do. |
| 9 | 1.0 wt. percent phosphoric acid (85%) | Do. |
| 10 | 0.1 wt. percent sulfuric acid (85%) | Do. |
| 11 | 0.25 wt. percent sulfuric acid (85%) | Do. |
| 12 | 0.5 wt. percent sulfuric acid (85%) | Do. |
| 13 | 1.0 wt. percent sulfuric acid (85%) | Do. |

[1] Wt. percent of additive based on wt. of propionitrile.

*Example IV*

Two runs were carried out in which 3-mercaptopropionitrile was synthesized by the reaction of hydrogen sulfide with acrylonitrile.

In one of the runs, 12 moles of acrylonitrile, 24 gm. of pyridine and 12 gm. of sulfur were charged to a 1-gal. stainless steel autoclave equipped with a stirrer and an internal steam coil for maintaining the reaction temperature at the desired level. The reactor was then closed and pressured with 24 moles of hydrogen sulfide, after which the reaction mixture was heated to 85° C. The reaction mixture was periodically sampled, and the samples were analyzed by gas-liquid chromatography for acrylonitrile content. All of the acrylonitrile had reacted within 15 min., so the reaction mixture was blown down hot from the autoclave. The reaction mixture was subjected to vacuum distillation in a steam jacketed distillation column, and after 1 hr., during which the pressure failed to drop below about 10 mm., it was determined that the lack of pressure drop was due to the decomposition of the 3-mercaptopropionitrile occurring at this temperature. Accordingly, 10 gm. of p-toluenesulfonic acid monohydrate was added to the kettle of the distillation column. Shortly thereafter, 3-mercaptopropionitrile began distilling overhead, and a yield of 44.3 mol percent based on the acrylonitrile originally charged was obtained.

The above run was then repeated except that the 10 gm. of p-toluenesulfonic acid monohydrate was added to the kettle of the distillation column at the time the reaction mixture was originally charged to the distillation column. No decomposition occurred during this run, and a yield of 62.5 mol percent of 3-mercaptopropionitrile was obtained, based on the acrylonitrile charge.

Various modifications and alterations of this invention will become apparent to those skilled in the art from the foregoing description and examples without departing from the scope and spirit of this invention, and it should be understood that this invention is not to be limited unduly to the illustrative embodiments of this invention set forth hereinbefore.

I claim:

1. A composition of matter consisting essentially of an admixture of a mercapto-substituted nitrile having the general formula:

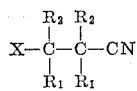

where $R_1$ is selected from the group consisting of hydrogen and lower alkyl hydrocarbon radicals, $R_2$, is selected from the group consisting of said $R_1$ radicals and —SH, and X is selected from the group consisting of cyano and —SH with the provision that (1) where X is —SH, both of said $R_2$ radicals are selected from the group consisting of hydrogen and said alkyl radicals, and (2) where X is a cyano radical, one of said $R_1$ radicals is selected from the group consisting of hydrogen and said alkyl radicals while the other $R_1$ radical is —SH, and an acid which stabilizes said nitrile wherein said acid is one which has an ionization constant greater than $1 \times 10^{-4}$ at 25° C.

2. A composition of matter consisting essentially of 3-mercaptopropionitrile and an amount of p-toluenesulfonic acid which is sufficient to stabilize said propionitrile.

3. A process for stabilizing a mercapto-substituted nitrile having the general formula

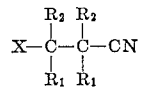

where $R_1$ is selected from the group consisting of hydrogen and lower alkyl hydrocarbon radicals, $R_2$ is selected from the group consisting of said $R_1$ radicals and SH, and X is selected from the group consisting of cyano and SH with the provisos that (1) where X is a mercapto, both of said $R_2$ radicals are selected from the group consisting of hydrogen and said alkyl radicals, and (2) where X is a cyano radical, one of said $R_2$ radicals is selected from the group consisting of hydrogen and said alkyl radicals while the other $R_2$ radical is SH, which comprises admixing with said mercapto-substituted nitrile an acid, having an ionization constant greater than $1 \times 10^{-4}$ at 25° C., in an amount sufficient to stabilize said mercapto-substituted nitrile.

4. A process according to claim 3 wherein said nitrile is 3-mercaptopropionitrile.

5. The process according to claim 4 wherein said acid is p-toluenesulfonic acid.

6. The process according to claim 4 wherein said acid is phosphoric acid.

7. The process according to claim 4 wherein said acid is sulfuric acid.

8. The process according to claim 4 wherein the amount of said acid used is in the range of 0.05 to 5 weight percent of said nitrile.

9. In a process for preparing 3-mercaptopropionitrile, wherein acrylonitrile is reacted with hydrogen sulfide in the presence of a catalytic amount of sulfur, and said propionitrile is recovered from the resulting reaction mixture by distillation thereof, the improvement comprising adding to said reaction mixture an acid, having an ionization constant greater than $1 \times 10^{-4}$ at 25° C., in an amount sufficient to stabilize said propionitrile during its recovery from said reaction mixture by said distillation.

10. The process according to claim 9, wherein said acid is p-toluenesulfonic acid.

References Cited by the Examiner

UNITED STATES PATENTS

| | | | |
|---|---|---|---|
| 2,429,452 | 10/1947 | Cass | 260—465 |
| 2,762,836 | 9/1956 | Selcer | 260—465 |

CHARLES B. PARKER, *Primary Examiner.*

J. P. BRUST, *Assistant Examiner.*